(12) United States Patent
Dietz et al.

(10) Patent No.: US 7,871,120 B2
(45) Date of Patent: Jan. 18, 2011

(54) FOUR-DOOR MOTOR VEHICLE HAVING A DOOR SEALING SYSTEM FOR FRAMELESS DOORS

(75) Inventors: Wolfgang Dietz, Graz (AT); Gernot Bindar, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 181 days.

(21) Appl. No.: 12/299,080

(22) PCT Filed: May 2, 2007

(86) PCT No.: PCT/EP2007/003869

§ 371 (c)(1),
(2), (4) Date: Oct. 30, 2008

(87) PCT Pub. No.: WO2007/124952

PCT Pub. Date: Nov. 8, 2007

(65) Prior Publication Data

US 2009/0100762 A1    Apr. 23, 2009

(30) Foreign Application Priority Data

May 2, 2006    (AT) .............................. GM357/2006

(51) Int. Cl.
*B60J 5/00* (2006.01)
(52) U.S. Cl. ..................................... 296/146.9; 49/502
(58) Field of Classification Search .............. 296/146.9, 296/193.06, 203.03; 292/5; 49/502, 449.1
See application file for complete search history.

(56) References Cited

U.S. PATENT DOCUMENTS

| 2,860,911 A | * | 11/1958 | Cotter | 296/202 |
| 2,997,336 A | * | 8/1961 | Grant et al. | 296/106 |
| 4,688,847 A | * | 8/1987 | Freudenberg | 296/146.9 |
| 4,932,712 A | * | 6/1990 | Tomforde | 296/146.9 |
| 5,860,692 A | | 1/1999 | Nozaki et al. | |

FOREIGN PATENT DOCUMENTS

DE    10346707    12/2004
WO    2006024427    3/2006

* cited by examiner

*Primary Examiner*—Dennis H Pedder
(74) *Attorney, Agent, or Firm*—Bachman & LaPointe, P.C.

(57) ABSTRACT

A four-door motor vehicle having a door sealing system for frameless doors, the body of which motor vehicle has a front (9) and a rear (11) door cutout, with an associated front door (7) and rear door, and a B pillar (4) between the door cutouts (9, 11), which B pillar (4) ends at the level of the sill (6), wherein the door cutouts (9, 11) are bordered by a primary seal (15, 17, 18). In order to meet high demands on impermeability, the primary seal (15, 17, 18) forms, at its part which surrounds the sill region of the B pillar (4), a sealing cushion (16) which projects outward from the B pillar, and the doors (7, 8) have, in the region of the cushion (16), molded parts (25, 35) which, when the doors are closed, bar against one another and against the sealing cushion (16), wherein the molded parts (25, 35) on the one hand seal off the windowpanes (23, 33) with respect to the door plates (20, 21, 30, 31) and on the other hand form a secondary seal (12) with one another, wherein the secondary seal seals off the region between the end faces, which face toward one another, of the two doors (7, 8).

4 Claims, 3 Drawing Sheets

FOUR-DOOR MOTOR VEHICLE HAVING A DOOR SEALING SYSTEM FOR FRAMELESS DOORS

BACKGROUND OF THE INVENTION

The invention relates to a four-door motor vehicle having a door sealing system for frameless doors, the body of which motor vehicle has on both sides a front and a rear door cutout and, between them, a B pillar which ends level with the window sill, wherein the door cutouts are bordered by a primary seal. Motor vehicles with frameless doors (coupés or convertibles) have been designed to date with two doors because a number of problems which arise in the case of four doors were considered insurmountable. The free end of the B pillar level with the window sill requires special stiffening and sealing measures.

The sealing is difficult because a row of sealing points has to be formed between moveable parts: in the form of a primary seal between the door cutout of the body and the doors, in the form of a secondary seal between the mutually facing end surfaces of the two doors, in the form of window channel seals between the windows (of course frameless) and the doors, and at the free upper end of the B pillar. All of the sealing points come together at said end. A further problem arises in that the lowerable windows, in the raised state, tightly adjoin each other in a sealing manner because of the lack of the upper part of a B pillar, but, in the lowered state, have to be at a distance from each other in the longitudinal direction in order to be able to be entirely accommodated by the door.

All of these problems have to meet the exacting impermeability requirements applicable in modern motor vehicle manufacturing.

SUMMARY OF THE INVENTION

The foregoing problems are solved by providing a four-door motor vehicle having a door sealing system for frameless doors, the body of which motor vehicle has a front and a rear door cutout, with an associated front door and rear door, and a B pillar between the door cutouts, which B pillar ends at the level of the sill, wherein the door cutouts are bordered by a primary seal. In order to meet high demands on impermeability, the primary seal forms, at its part which surrounds the sill region of the B pillar, a sealing cushion which projects outward from the B pillar, and the doors have, in the region of the cushion, molded parts which, when the doors are closed, bear against one another and against the sealing cushion, wherein the molded parts on the one hand seal off the windowpanes with respect to the door plates, and on the other hand form a secondary seal with one another, wherein the secondary seal seals off the region between the end faces, which face toward one another, of the two doors.

BRIEF DESCRIPTION OF THE DRAWINGS

The invention is described and explained below with reference to figures, in which.

DETAILED DESCRIPTION

Figure 1:
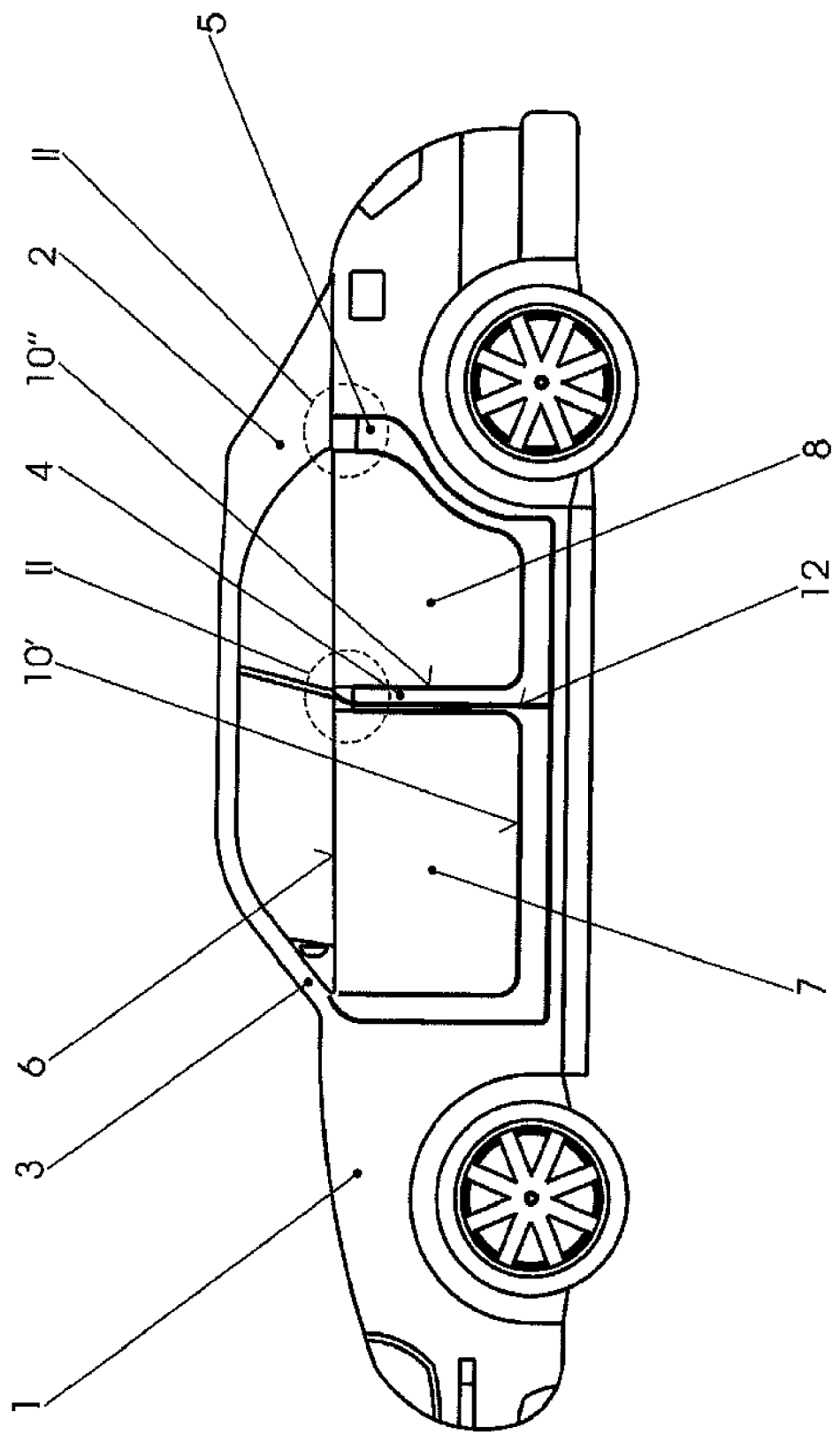
FIG. 1 shows a side view of a motor vehicle according to the invention.

In FIG. 1, the body, for example that of a convertible, is denoted by 1 and the folding roof thereof by 2; the roof could also be the fixed and optionally removable roof of a coupé. On both sides, the body has an A pillar 3 which reaches over the entire height of the vehicle, and a B pillar 4 and a C pillar 5 which reach only as far as a window sill 6. Since the convertible here is a four-door one, there are front doors 7 and rear doors 8 which fit into door cutouts 9, 11 of the body 1 (see FIG. 2). A primary seal 10', 10" and a secondary seal 12 between the two doors 7 and 8 are shown by lines in bold, although they are not visible when the doors are closed.

Figure 2:
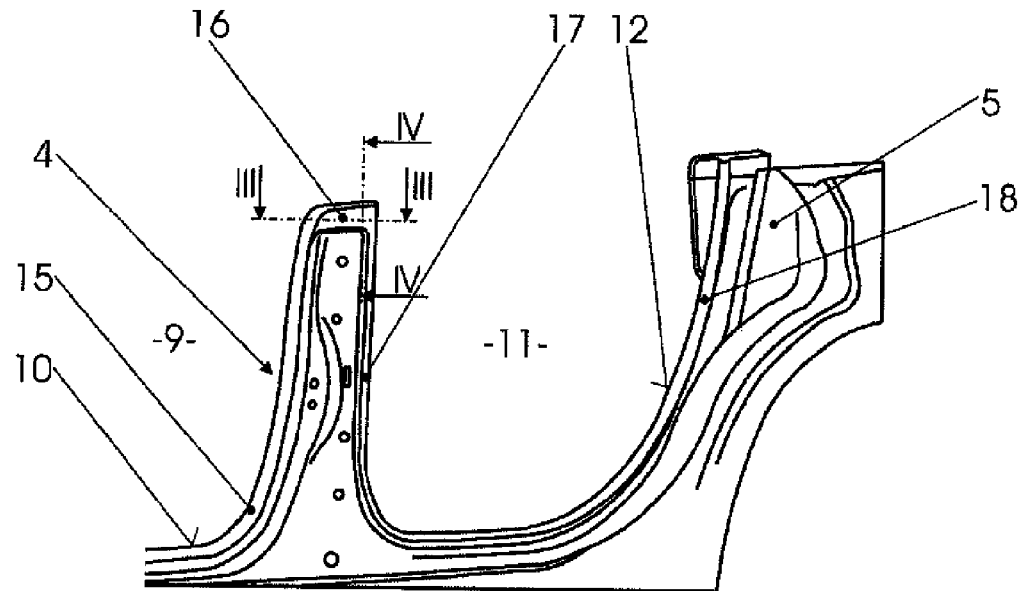
FIG. 2 shows the detail II in FIG. 1, without doors.

FIG. 2 illustrates, without doors, the part containing the B pillar which reaches only as far as the window sill 6. The B pillar is a hollow body which comprises two sheet-metal parts connected at the edges 4', 4" (see FIG. 4). The primary seal 10', 10" is fitted onto said edges in the customary manner. The primary seal comprises the parts 15, 17, which border the B pillar, and the part 18 on the C pillar. The primary seal forms a sealing cushion 16 level with the window sill, at the upper end of the B pillar.

Figure 3:
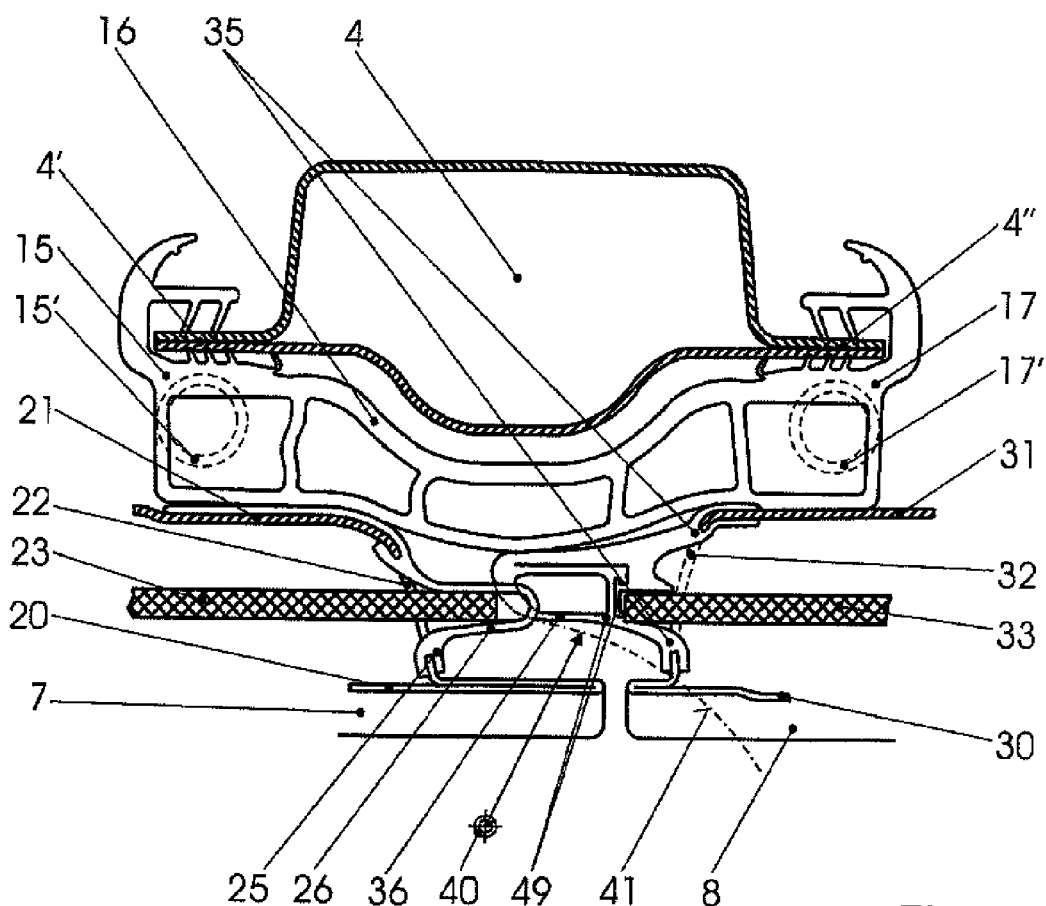
FIG. 3 shows a horizontal section according to III-III in FIG. 2.

FIG. 3 shows a section through the B pillar level with the sealing cushion 16. The latter is a flexible body which reaches over the entire extent of the B pillar 4 in the longitudinal direction of the vehicle and is combined at the front and rear with those parts 15, 17 of the primary seal which are fitted onto the edges 4', 4". In the exemplary embodiment shown, the sealing cushion 16 is a hollow body with a plurality of chambers, but it could also be a solid body or foam body which can be compressed to the required extent. The sealing cushion 16 is provided only in the region of the upper end of the B pillar and is downwardly adjoined by tubes 15', 17', of the type of conventional embodiments of a door seal, which tubes are integral with the parts 15, 17 of the primary seal.

Only the rear edge of the front door 7 can be seen. It comprises an outer panel 20, an inner panel 21 and an end surface which faces the rear door 8 and has a cutout 22. The window pane is denoted by 23. A molded part 25 which forms a sealing bead 26 which faces the rear door 8 sits in the cutout 22 between the edges of the panels 20, 21. The rear door 8 likewise comprises an outer panel 30 and an inner panel 31. In the end side of said door, which side faces the front door 7, a cutout 32 is provided for the insertion of a molded part 35, the sealing bead 36 of which bears against the sealing cushion 16 and interacts with the sealing bead in such a manner that it slides between said sealing bead and the sealing cushion 16 when the door is closed. In FIG. 3, the two sealing beads 26, 36 are shown in a nondeformed state and overlapping each other. In reality, they are appropriately deformed.

To explain this arrangement of the two sealing beads 26, 36, the hinge axis 8 of the rear door 40 and the envelope curve of the sealing bead 36 during opening of the rear door 8 are shown. The shown relative position of the two sealing beads 26, 36 permits the front door 7 to be opened and closed when the rear door is open and permits the rear door 8 to be opened and closed when the front door 7 is closed. The window pane of the rear door is denoted by 33.

A sash seal 49 is provided on the rear window pane 33, said sash seal ensuring sealing between the closed front window pane 23 and rear window pane 33 and the leakproof transition to the sealing bead 36 of the rear door 8.

Figure 4:
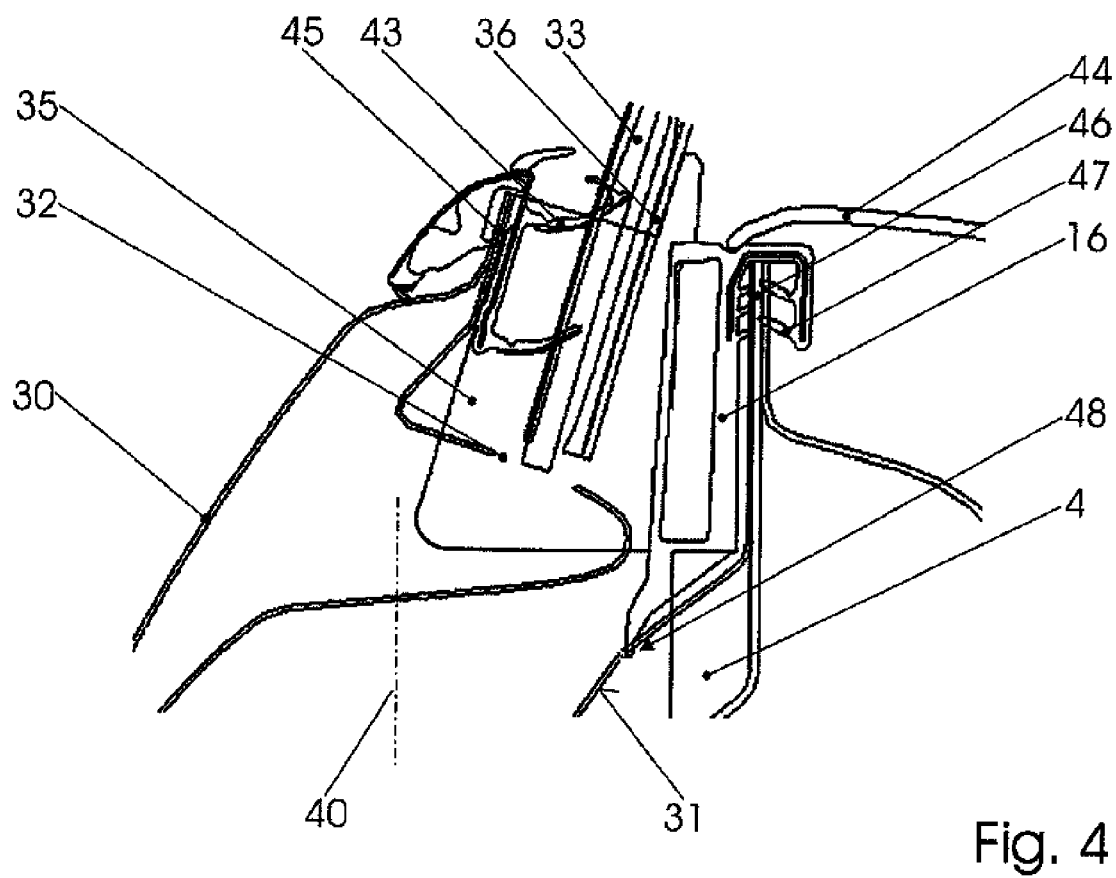
FIG. 4 shows a vertical section IV-IV in FIG. 2.

In the vertical section of FIG. 4 it can be seen that the sealing cushion 16 of the primary seal is also fitted onto the upper edge of the B pillar 4 and extends downward in the vertical direction from the upper edge 46 only as far as a lip 48 which bears against the inner panel 31 of the B pillar 4. It can be seen that the sealing cushion 16 is also combined at the upper edge 46 of the B pillar 4 into the clamping profile running along the edges 4', 4" of the entire B pillar. It can furthermore be seen that the second molded part 35 bears with its inner side against the sealing cushion 16 and on its outer side merges into a window channel seal 43 which produces the impermeability between the window pane 33 and the upper edge 45 of the outer panel 30 of the door.

The invention claimed is:

1. A four-door motor vehicle comprising a door sealing system for frameless doors, the motor vehicle has a front door cutout and a rear door cutout and, between them, a B pillar which ends level with a window sill, wherein the door cutouts are bordered by a primary seal, wherein
 a) the primary seal, at its part which surrounds the window sill region of the B pillar, forms a sealing cushion which projects outward from the B pillar,
 b) in the region of the cushion, the doors have molded parts which bear against each other and against the sealing cushion when the doors are closed,
 c) the molded parts sealing off the windowpanes in relation to the door panels and forming a secondary seal with each other.

2. The four-door motor vehicle as claimed in claim 1, wherein the molded parts, on their mutually facing sides, form flexible sealing beads which interact with each other.

3. The four-door motor vehicle as claimed in claim 2, wherein, the doors are fastened at their side which is in front in the direction of travel to the body by means of hinges, wherein the sealing bead of the molded part of the rear door is closer to the sealing cushion than the sealing bead of the molded part of the front door, and therefore it partially slides between the sealing bead of the front door and the sealing cushion when the rear door is closed.

4. The four-door motor vehicle as claimed in claim 1, wherein the molded parts are inserted into cutouts on the respective end side of the respective door and are fitted onto the upper window sill edge of the door.

* * * * *